United States Patent
Oster

(10) Patent No.: US 8,147,267 B2
(45) Date of Patent: Apr. 3, 2012

(54) BASE FOR RETROFIT LED LIGHTING DEVICE

(75) Inventor: Stephen Paul Oster, Auburn, CA (US)

(73) Assignee: Xeralux, Inc., San Jose, CA (US)

( * ) Notice: Subject to any disclaimer, the term of this patent is extended or adjusted under 35 U.S.C. 154(b) by 0 days.

(21) Appl. No.: 12/874,757

(22) Filed: Sep. 2, 2010

(65) Prior Publication Data

US 2012/0058663 A1 Mar. 8, 2012

(51) Int. Cl.
*H01R 4/50* (2006.01)

(52) U.S. Cl. .................................. 439/339; 439/641

(58) Field of Classification Search .................. 439/339, 439/340, 345, 642, 641, 647, 648, 657, 168, 439/220, 232, 375, 667
See application file for complete search history.

(56) References Cited

U.S. PATENT DOCUMENTS

| | | | | |
|---|---|---|---|---|
| 2,037,653 A * | 4/1936 | Fow | ................................ | 439/642 |
| 2,842,700 A * | 7/1958 | Jacobs | ...................... | 313/318.04 |
| 3,281,620 A * | 10/1966 | Miller | ........................... | 313/113 |
| 3,489,991 A * | 1/1970 | Hilzen | ........................... | 439/340 |
| 3,530,330 A * | 9/1970 | Dupree | ...................... | 313/318.03 |
| 3,784,867 A * | 1/1974 | Dupree | ...................... | 313/318.03 |
| 5,352,122 A * | 10/1994 | Speyer et al. | .................... | 439/13 |
| 6,582,269 B2 * | 6/2003 | Sakai et al. | ...................... | 445/26 |
| 6,638,074 B1 * | 10/2003 | Fisher | ............................. | 439/22 |
| 7,296,913 B2 | 11/2007 | Catalano et al. | | |
| 7,749,001 B2 * | 7/2010 | Ma | ................................ | 439/131 |

* cited by examiner

*Primary Examiner* — Hae Moon Hyeon
(74) *Attorney, Agent, or Firm* — Wilson Sonsini Goodrich & Rosati

(57) ABSTRACT

A modified screw-in (Edison) type base for LED lighting devices that enables directional LED devices to be used in existing sockets. A movable center contact in a standard Edison type threaded base that enables the base to be screwed into a socket to make electrical contact while allowing the base to be rotated at least a half turn to allow a directional LED device to be aimed were the light is desired. The modified screw-type base that has a movable mount enabling a directional LED device to be firmly screwed into a standard bulb socket, then rotated to aim the light where it is desired.

10 Claims, 5 Drawing Sheets

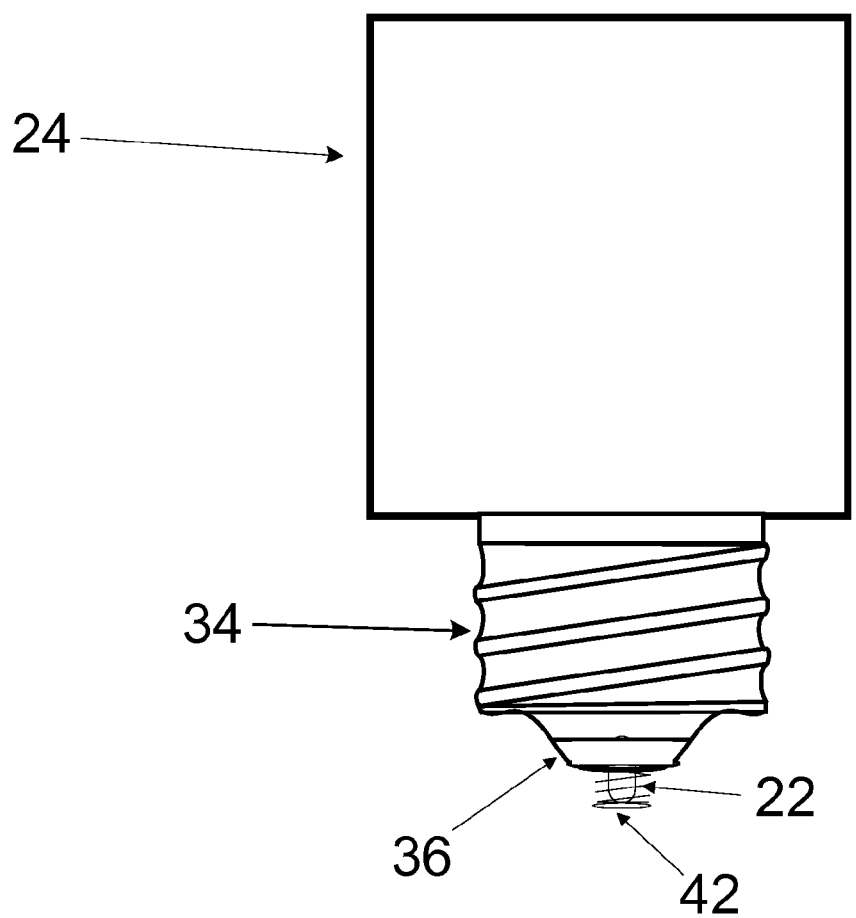

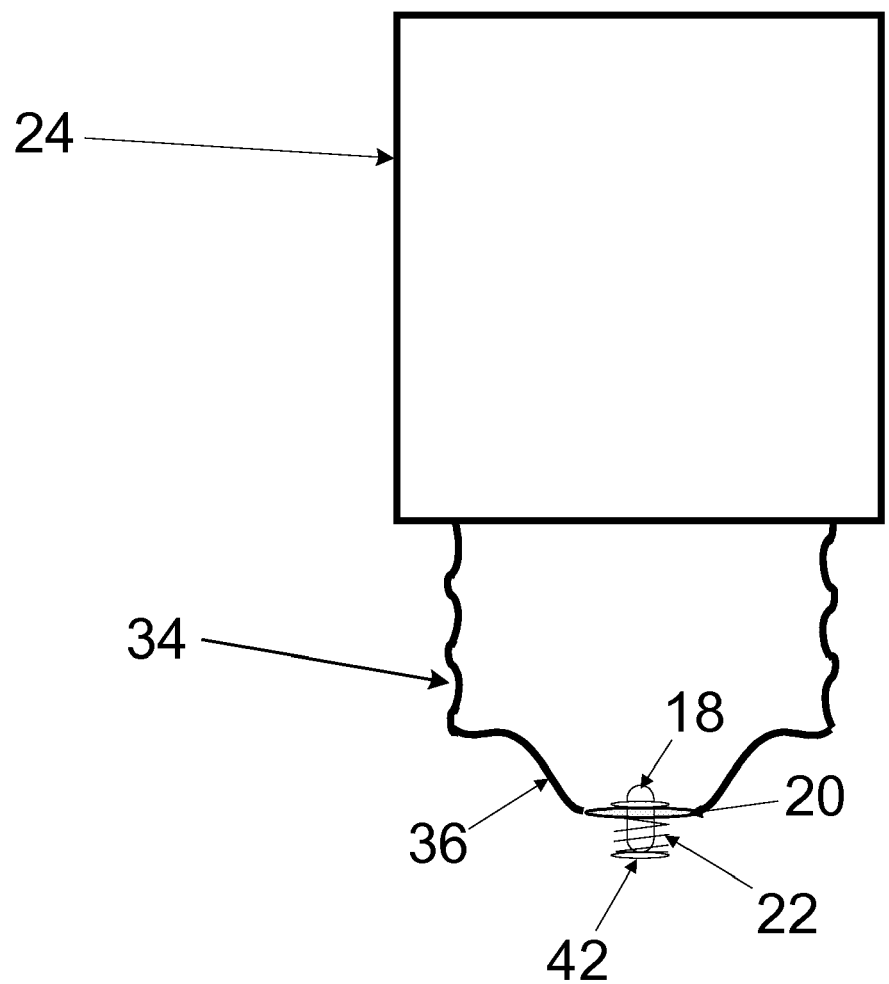

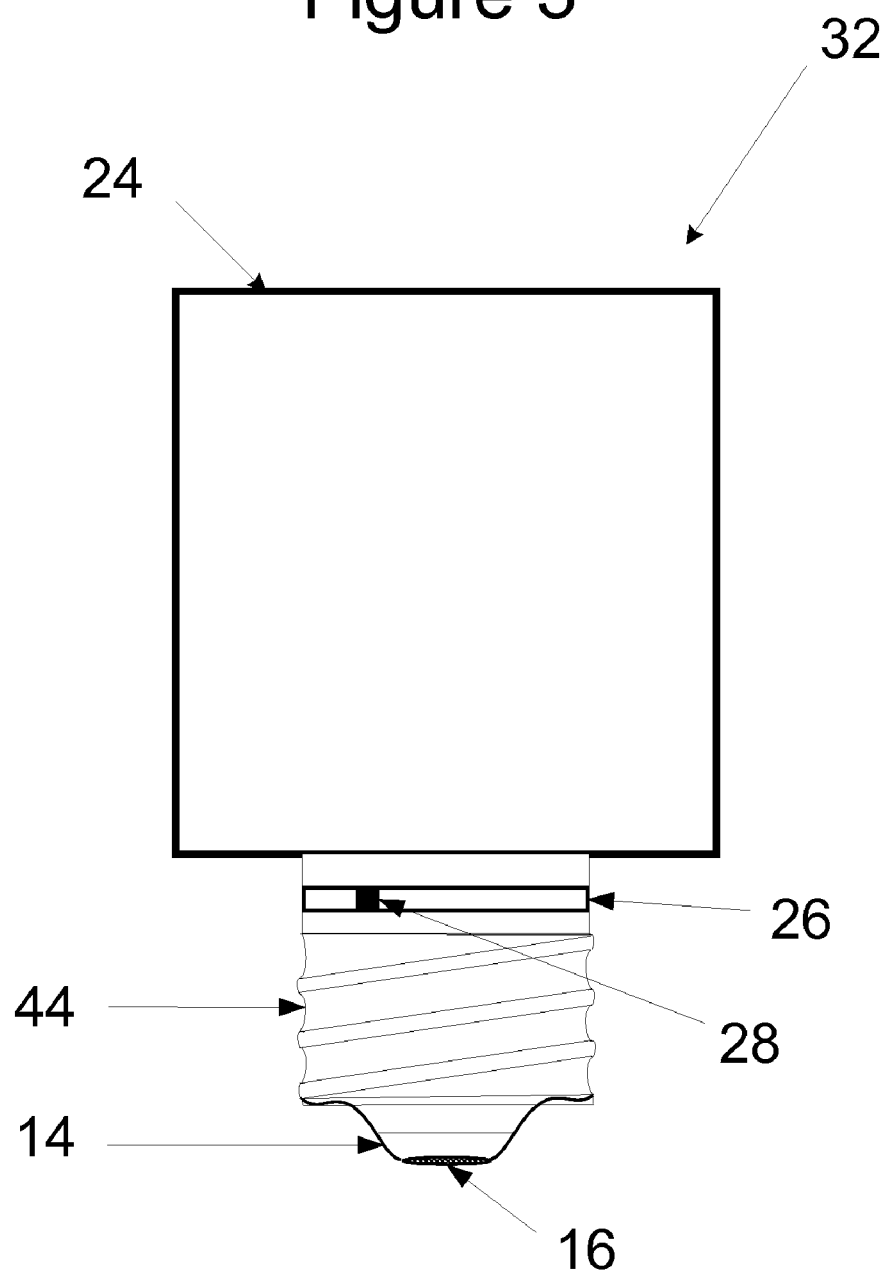

BASE FOR RETROFIT LED LIGHTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This disclosure relates to commercial and residential lighting, and in particular to lighting fixtures designed for screw-in type bulbs, and more particularly to the base of a light-emitting diode (LED) light source intended for use in existing fixtures designed for screw-in type bulbs.

There are millions of existing lighting fixtures originally designed to use incandescent bulbs with the screw-in bases (known to the industry as Edison bases, one example is Edison E26). In recent years compact fluorescent lamps (CFLs) have emerged as a replacement for the much less-efficient incandescent bulbs. Now LED lighting is as efficient as the CFLs, with vastly longer lifetime and without toxic components. One problem with LEDs as replacements for traditional light bulbs and CFLs is that LEDs emit light in a directional manner instead of in all directions.

But there are particular applications that minimize the disadvantage of LEDs noted above. One such application is in wall sconce lights, which do not require the lighting source to radiate light in all directions. The lighting is needed in one direction, radiating away from the wall, with reflection from the diffusing lens or shade sufficient to provide backlighting for appearance. In such an application, not as many total Lumens of light are required because much less light is wasted. Accordingly, less light output means less energy is required and less heat is generated, simplifying the problem of thermal management. This light can be provided by mounting LEDs on only one side of a heat sink structure.

There remains a problem with designing a directional LED light device to serve as a screw-in replacement for incandescent bulbs or CFLs. A bulb is typically screwed into a socket until it makes electrical contact and is hand-tight. A directional LED-based replacement with LEDs mounted on one side may be pointed at a non-ideal angle with respect to where the light is needed when fully screwed into the socket. It may be possible to turn the device counterclockwise somewhat to aim it correctly but that will loosen the device in the socket and may diminish or even break the electrical connection. This condition could either cause the light to go out, or result in a poor electrical connection that gets hot and creates a fire hazard.

The present invention is a bulb base that has a movable or flexible center contact, enabling the LED bulb to screw into a common screw-type socket while making good electrical contact and aiming the light where it is needed. Another embodiment of the invention is a base that screws all the way into any common screw-type socket, then allows the attached LED device to be rotated on the base so the light source can be aimed in the desired direction.

In U.S. Pat. No. 7,296,913, Catalano discloses an LED device that has a separate screw type base intended to screw in to a conventional light bulb socket. Wires then conduct the electrical power to the LED device, which is mounted independently of the base and socket. This differs from the present invention because it does not physically support the LED device in the socket.

SUMMARY OF THE INVENTION

The present invention is a screw-in type base for directional LED devices that enables use of the LED light device in existing light fixtures designed for screw-in light bulbs. The base provides electrical connection for the LED device, plus structural support. The LED device can then be used in any existing light fixture that has a socket designed for the screw-in type bulbs.

BRIEF DESCRIPTION OF THE DRAWINGS

FIG. 2a is a side view of a base that incorporates the present invention;

FIG. 2b is a side cutaway view of the base of FIG. 2a, showing the preferred embodiment of the present invention;

FIG. 3 is a side view of an LED device mounted on a screw-type base using another embodiment of the invention;

DETAILED DESCRIPTION OF THE INVENTION

Figure 1:
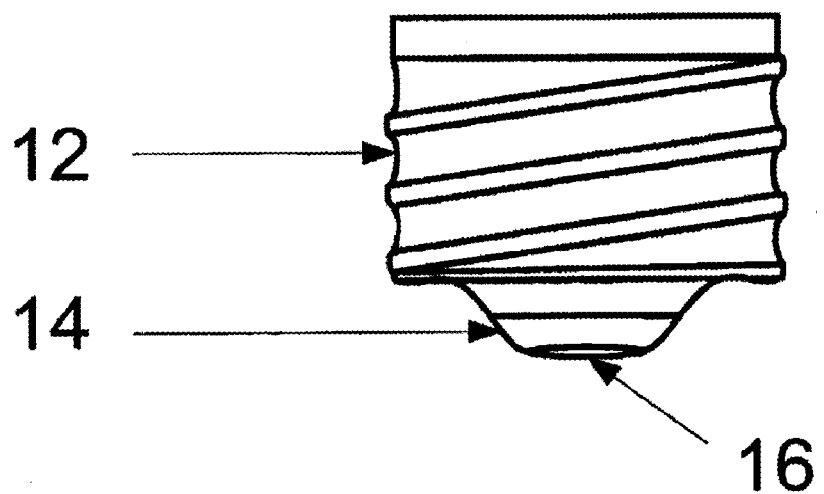
FIG. 1 is a side view of a standard incandescent light bulb base.

Referring now to FIG. 1 there is shown a standard (Edison-type) base 12 that is commonly screwed into a common light bulb socket. Base 12 includes a small circular metal contact 16, separated from the metal threads by glass or ceramic insulator 14. The metal threads of base 12 and the circular metal contact 16 are electrical contacts through which power is provided to the bulb filament.

FIG. 2a shows the standard base 12 of FIG. 1 modified as base 34 for the present invention. An LED device 24 is mounted on base 34.

FIG. 2b is a cutaway view of base 34 that shows the preferred embodiment of the present invention. The LED device 24 is attached to base 34. Insulator 14 has a hole in its center, through which metal rod 18 passes. Cap 20 on rod 18 prevents rod 18 from falling through the hole in insulator 36. Circular metal contact 16 is placed on the lower end of rod 18. Spring 22 is placed around rod 18 between insulator 36 and circular metal contact 16.

Referring now to FIG. 2b, the metal threads of base 34 and rod 18 are the electrical contacts for the present invention and would be connected internally by wires to the LED light source. In use, spring 22 keeps rod 18 protruding through the hole in insulator 36 by several millimeters. As the base 34 is screwed into a socket, the circular metal contact 42 makes electrical contact, then as base 34 is screwed in further, spring 22 is compressed, allowing rod 18 to be pushed up into base 34. This enables base 34 to be rotated by at least a half turn in a socket, while maintaining full electrical contact.

The construction details of the base 34 shown in FIG. 2b are that the base 34 is made of metal, insulator 36 is made of glass, ceramic, Bakelite, plastic, or any other suitable insulating material. Cap 20, rod 18, and circular metal contact 42 are made of metal. Spring 22 is made of metal or any suitable material, as it has no electrical function. In FIG. 2 spring 22 and rod 18 are shown longer than needed for clarity in illustration; in practice rod 18 will only protrude through insulator 36 by a few millimeters, specifically the distance the vertical distance the base moves in the socket when it is rotated one half turn.

Figure 4:
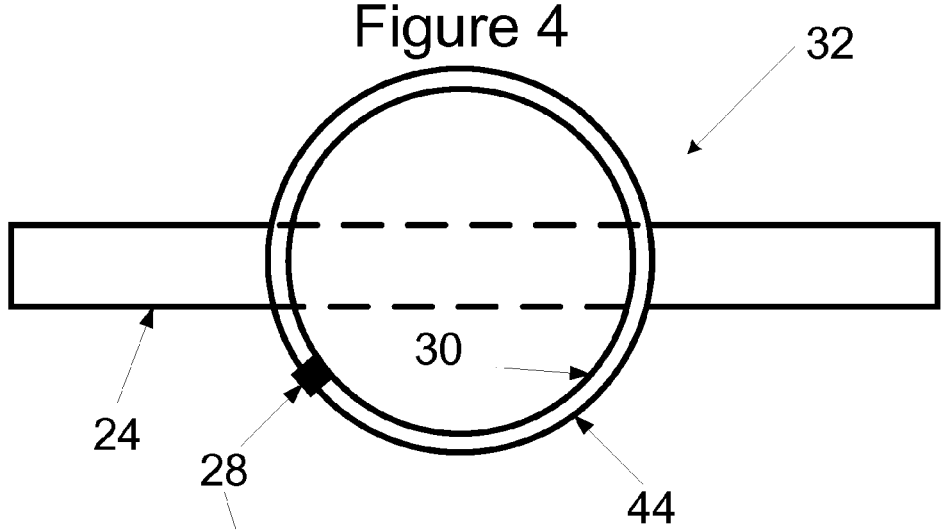
FIG. 4 is an enlarged top view and cutaway of the device shown in FIG. 3.

FIG. 4 shows another embodiment of the invention, assembly 32. LED device 24 is mounted on base 44, which has insulator 46 and circular metal contact 48. Base 44 has a slot 26 in the metal near the top edge; the slot extends along base 44 for one half of its circumference. Tab 28 protrudes through slot 26. Tab 28 is attached to the mounting for LED device 24.

Figure 5:
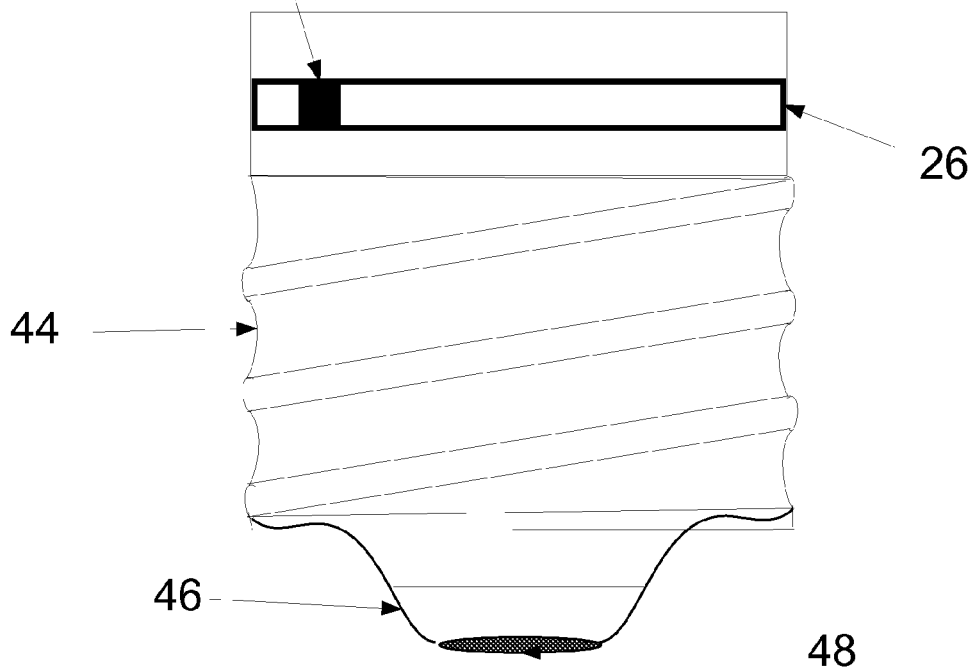
FIG. 5 is an enlarged side view of the base of FIG. 3.

Referring now to FIGS. 3 through 5, LED device 24 is positioned over the top of base 44. The LED device 24 is mounted on a cylindrical mount 30 that fits inside of base 44. Tab 28 is part of mount 30 and protrudes through slot 26. Mount 30 is just slightly smaller than base 44 so that it fits into base 44, but supports the LED device 24 firmly. In practice assembly 32 is screwed into a standard light bulb socket. When turning assembly 32 clockwise to screw it in, LED device 24 will make up to a half turn before tab 28 reaches the rightmost end of slot 26, at which time base 44 will also begin to turn clockwise. The entire assembly 32 then turns clockwise as a unit until base 44 is firmly screwed into the socket, providing both good mechanical support for assembly 32 and good electrical contact with the socket. Then LED device 24 can be rotated counterclockwise as needed to aim its light output where desired, as much as 180 degrees until tab 28 reaches the opposite end of slot 26.

Referring now to FIGS. 3 through 5 in more detail, slot 26 is shown taller than needed for purposes of illustrating detail. In practice, slot 26 can be no more than a slit in the side of base 44 and tab 28 can be just the thickness of the metal in height. Circular mount 30 of LED device 24 can be made out of metal or plastic, as long as it is sufficiently robust; the use of plastic offers protection from exposure to the electrical components inside and protects the user from shock hazard. The tolerances between mount 30 and base 44, and tab 28 and slot 26 must be tight enough so that the entire assembly 32 is held and supported firmly.

The materials used to make mount 30 and tab 28 can be metal or plastic as there is no electrical function provided by them.

In broad embodiment, the present invention is a modification of the standard (Edison-type) light bulb base that allows use with a directional light source such as an LED device. An LED device using this base can be rotated to direct the light where it is desired.

The advantages of the present invention include, without limitation, the ability to screw a directional LED lighting device using this threaded base into a typical socket and provide physical support plus good electrical contact, yet be able to turn the device clockwise or counterclockwise at least a quarter turn so the device can aim the light where it is needed.

SUMMARY

A movable center electrical contact for a standard screw-type bulb base that enables directional LED devices to be used as screw-in replacements for existing lighting types (including incandescent and CFLs).

A screw-in type base for standard Edison-type bulb sockets that screws in firmly to a socket yet has a rotatable lamp base that allows a mounted directional LED light source to be rotated up to 180 degrees to aim the light where it is needed.

While the foregoing written description of the invention enables one of ordinary skill to make and use what is considered presently to be the best mode thereof, those of ordinary skill will understand and appreciate the existence of variations, combinations, and equivalents of the specific embodiments, method, and examples herein. The invention should therefore not be limited by the above described embodiments, method, and examples, but by all embodiments and methods within the scope and spirit of the invention as claimed.

The invention claimed is:

1. A screw-in type base for a light-emitting diode (LED) lighting device comprising:
    an LED light source; and
    a movable conductor mounted in the center of the base, and configured to make electrically conductive contact with a center conductor of a socket the base is screwed into, wherein the movable conductor is configured to remain in electrical communication with the LED light source.

2. The base of claim 1 where the movable conductor includes a spring around the movable conductor to ensure firm contact with the center conductor of the socket regardless of how tightly the base is screwed in to the socket.

3. The base of claim 1 with a cap placed at an end of the movable conductor to hold the conductor in place in the base.

4. The base of claim 1 with insulating material surrounding the movable conductor to insulate the movable conductor from metal threads of the base.

5. The base of claim 1, further comprising metal threads in electrical communication with the LED light source.

6. The base of claim 5, wherein the metal threads and the movable conductor are electrically connected to the LED light source via wires.

7. A screw-in type base for an LED lighting device comprising:
    an outer cylinder and an inner cylinder, wherein the inner cylinder is at least partially inside the outer cylinder, and wherein the inner cylinder is configured to rotate up to one-quarter turn clockwise or counterclockwise relative to the outer cylinder and wherein further rotation of the inner cylinder causes the outer cylinder to turn; and
    a light-generating portion of the device connected to the inner cylinder and configured to rotate with the inner cylinder, wherein the light-generating portion comprises an LED light source; and
    a metal contact in electrical communication with the LED light source, and configured to make electrically conductive contact with a center conductor of a socket the base is screwed into.

8. The base of claim 7 with a slot in the outer cylinder and a small tab in the side of the inner cylinder such that the tab protrudes through the slot in the outer cylinder, enabling the inner cylinder to rotate up to one-quarter turn clockwise or counterclockwise before further rotation causes the outer cylinder to also turn.

9. The base of claim 7 where the outer and inner cylinder are made of an insulating material to protect the user from electric shock hazard.

10. The base of claim 7 in which electronics to power and regulate the LED light source are mounted within the inner cylinder.

\* \* \* \* \*